US011908426B2

(12) United States Patent
Zhang et al.

(10) Patent No.: US 11,908,426 B2
(45) Date of Patent: Feb. 20, 2024

(54) DISPLAY PANEL DRIVING METHOD, DISPLAY DEVICE AND DRIVING DEVICE

(71) Applicant: TCL CHINA STAR OPTOELECTRONICS TECHNOLOGY CO., LTD., Shenzhen (CN)

(72) Inventors: Yun Zhang, Shenzhen (CN); Xinhong Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/431,151

(22) PCT Filed: May 27, 2021

(86) PCT No.: PCT/CN2021/096470

§ 371 (c)(1),
(2) Date: Sep. 1, 2022

(87) PCT Pub. No.: WO2022/178992

PCT Pub. Date: Sep. 1, 2022

(65) Prior Publication Data

US 2023/0351978 A1 Nov. 2, 2023

(30) Foreign Application Priority Data

Feb. 24, 2021 (CN) ......................... 202110209741.0

(51) Int. Cl.
*G09G 3/36* (2006.01)
*G09G 3/3225* (2016.01)

(52) U.S. Cl.
CPC ......... *G09G 3/3607* (2013.01); *G09G 3/3225* (2013.01); *G09G 2320/0233* (2013.01); *G09G 2320/0673* (2013.01)

(58) Field of Classification Search
CPC ... G09G 3/3607; G09G 3/3225; G09G 3/3233
See application file for complete search history.

(56) References Cited

U.S. PATENT DOCUMENTS

2018/0322834 A1* 11/2018 Zhang .................. G09G 3/3607
2021/0358406 A1* 11/2021 Zhang .................. G09G 3/3233

* cited by examiner

*Primary Examiner* — Sardis F Azongha
(74) *Attorney, Agent, or Firm* — PV IP PC; Wei Te Chung; Zhigang Ma

(57) ABSTRACT

A display panel driving method, a display device and a driving device are provided. The method obtains a standard driving voltage value of a target pixel when a subject display content is being displayed and a target compression unit corresponding to the target pixel, determines a target compensation curve parameter from compressed de-Mura data corresponding to the target compression unit according to the standard driving voltage value, determines an effective driving voltage value of the target pixel when the subject content is being displayed according to a position information where the target pixel is in the target compression unit and the target compensation curve parameter, and drives the display panel according to the effective driving voltage. This method could correctly identify the corresponding decompression data and thus the decompressed data could be close to the actual data. This raises the decompression accuracy of decompressing the de-Mura data.

18 Claims, 5 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| – – – Original | 218 | 220 | 220 | 221 | 223 | 224 | 224 | 223 | 224 | 222 | 223 | 221 | 222 | 221 | 220 | 218 |
| ——— Fitted | 218 | 220 | 221 | 222 | 222 | 223 | 223 | 223 | 223 | 223 | 223 | 222 | 222 | 221 | 219 | 218 |

DISPLAY PANEL DRIVING METHOD, DISPLAY DEVICE AND DRIVING DEVICE

RELATED APPLICATIONS

This application is a US national phase application based upon an International Application No. PCT/CN2021/096470, filed on May 27, 2021, which claims the priority of Chinese Patent Application No. 202110209741.0, entitled “DISPLAY PANEL DRIVING METHOD, DISPLAY DEVICE AND DRIVING DEVICE”, filed on Feb. 24, 2021, the disclosure of which is incorporated herein by reference in its entirety.

FIELD OF THE DISCLOSURE

The present disclosure relates to a display technology, and more particularly, to a display panel driving method, a display device and a driving device.

BACKGROUND

The display panel may have uneven luminance, which introduces all kinds of spots, and affect the display quality. This effect is called Mura. As the progress of the display technology, the size of the display panel becomes larger. Therefore, the manufacturing process of the display panel becomes more difficult and the Mura phenomenon occurs more frequently. Because of that, a de-Mura operation is developed to compensate for the Mura such that the luminance of the display panel could be consistent. The de-Mura operation comprises obtaining the luminance of the display panel to get the Mura information, creating a de-Mura look-up table according to some calculations, and using a hardware control chip to perform the compensation operation through looking up the de-Mura look-up table.

Conventionally, the compression/decompression operation of the de-Mura data is performed through a linear compression/decompression process. The de-Mura look-up table stores the gray value of each gray level. This kind of compression has lower encryption level for the data and thus the de-Mura technique might be leaked and unsafe. In addition, if the data between the compressed points are not in a linear relationship, the linear compression/decompression process will introduce data distortions and ruins the de-Mura effect.

From the above, the conventional compression/decompression operation has the issue of data distortion and needs to be improved.

SUMMARY

Technical Problem

One objective of an embodiment of the present disclosure is to provide a display panel driving method, a display device and a driving device, for alleviate the issue of data distortion in the conventional compression/decompression operation.

Technical Solution

According to an embodiment of the present disclosure, a method for driving a display panel, the display panel comprising a plurality of compression units arranged in an array is disclosed. The method comprises: obtaining a standard driving voltage value of a target pixel when a subject display content is being displayed; obtaining a target compression unit corresponding to the target pixel; determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit; determining an effective driving voltage value of the target pixel when the subject content is being displayed according to a position information where the target pixel is in the target compression unit and the target compensation curve parameter; and driving the display panel according to the effective driving voltage of the target pixel of the display panel.

Optionally, the method further comprises following steps before the step of obtaining the standard driving voltage value of the target pixel when the subject display content is being displayed:

obtaining a compression parameter and a decompression method;

determining a pixel to be tested in the compression unit according to the compression parameter;

obtaining a compensation parameter corresponding to the subject driving voltage value of the pixel to be tested;

performing a fitting operation on the compensation parameter to obtain a fitted compensation parameter; and determining compressed de-Mura data corresponding to the compression unit according to the fitted compensation parameter.

Optionally, the step of performing the fitting operation on the compensation parameter to obtain the fitted compensation parameter comprises:

determining a curve type according to a variance trend of the compensation parameter, wherein the curve type comprises a parabola; and performing the fitting operation on the compensation parameter according to the curve type to obtain the fitted compensation parameter.

Optionally, the step of performing the fitting operation on the compensation parameter according to the curve type to obtain the fitted compensation parameter comprises:

setting a compensation equation corresponding to the compensation curve according to the curve type; and determining the compensation curve parameter of the compensation curve according to the fitted compensation parameter.

Optionally, the position information of the target pixel in the target compressing unit comprises a first row and the step of determining the effective driving voltage value of the target pixel when the subject content is being displayed according to the position information where the target pixel is in the target compression unit and the target compensation curve parameter comprises:

obtaining a global row identification of the target pixel;

performing a complementation operation on the global row identification according to the compression parameter to obtain a unit row identification of the target pixel; and determining the effective driving voltage value of the target pixel when the subject display content is being displayed according to the unit row identification, the compression equation and the target compensation curve parameter.

Optionally, the position information of the target pixel in the target compressing unit comprises a first column and the step of determining the effective driving voltage value of the target pixel when the subject content is being displayed according to the position information where the target pixel is in the target compression unit and the target compensation curve parameter comprises:

obtaining a global column identification of the target pixel;

performing a complementation operation on the global column identification according to the compression parameter to obtain a unit column identification of the target pixel; and determining the effective driving voltage value of the target pixel when the subject display content is being displayed according to the unit column identification, the compression equation and the target compensation curve parameter.

Optionally, the position information of the target pixel in the target compressing unit comprises a position other than a first row or a first column and the step of determining the effective driving voltage value of the target pixel when the subject content is being displayed according to the position information where the target pixel is in the target compression unit and the target compensation curve parameter comprises:

obtaining a global column identification and a global row identification of the target pixel;

respectively performing a complementation operation on the global column identification and the global row identification according to the compression parameter to obtain a unit column identification and a unit row identification of the target pixel; and determining a first effective driving voltage value corresponding to the unit row identification and a second effective driving voltage value corresponding to the unit column identification; and calculating a comparison value between the first effective driving voltage value and the second effective driving voltage value and determining the comparison value as the effective driving voltage value of the target pixel when the subject display content is being displayed.

Optionally, the driving voltage value comprises a gray-scale voltage value.

Optionally, the step of obtaining the standard driving voltage value of the target pixel when the subject display content is being displayed comprises:

obtaining a gamma curve and a luminance value of the target pixel; and determining the standard driving voltage value of the target pixel when the subject display content is being displayed according to the gamma value and the luminance value of the target pixel.

Optionally, the step of obtaining the compensation parameter corresponding to the subject driving voltage value of the pixel to be tested comprises:

obtaining the subject driving voltage value and an actual driving voltage value of the pixel to be tested; and determining the compensation parameter corresponding to the subject driving voltage value of the pixel to be tested according to a difference between the subject driving voltage value and the actual driving voltage value.

According to an embodiment of the present disclosure, a display device comprises: a display panel comprising a plurality of compression units arranged in an array; and a driving chip, configured to perform operations comprising:

obtaining a standard driving voltage value of a target pixel when a subject display content is being displayed;

obtaining a target compression unit corresponding to the target pixel;

determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit;

determining an effective driving voltage value of the target pixel when the subject content is being displayed according to a position information where the target pixel is in the target compression unit and the target compensation curve parameter; and driving the display panel according to the effective driving voltage of the target pixel of the display panel.

According to an embodiment of the present disclosure, a driving device is disclosed. The driving device comprises: a first obtaining module, configured to obtain a standard driving voltage value of a target pixel when a subject display content is being displayed; a second obtaining module, configured to obtain a target compression unit corresponding to the target pixel; a first determination module, configured to determine a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit; a second determination module, configured to determine an effective driving voltage value of the target pixel when the subject content is being displayed according to a position information where the target pixel is in the target compression unit and the target compensation curve parameter; and a driving module, configured to drive the display panel according to the effective driving voltage of the target pixel of the display panel. The driving device further comprises a third obtaining module, configured to obtain a compression parameter and a decompression method, configured to determine a pixel to be tested in the compression unit according to the compression parameter, configured to obtain a compensation parameter corresponding to the subject driving voltage value of the pixel to be tested, configured to perform a fitting operation on the compensation parameter to obtain a fitted compensation parameter, and configured to determine compressed de-Mura data corresponding to the compression unit according to the fitted compensation parameter.

According to an embodiment of the present disclosure, a method for driving a display panel is provided. The display panel comprising a plurality of compression units arranged in an array, the method comprises:

obtaining a compression parameter and a decompression method;

determining a pixel to be tested in the compression unit according to the compression parameter;

obtaining a compensation parameter corresponding to the subject driving voltage value of the pixel to be tested;

performing a fitting operation on the compensation parameter to obtain a fitted compensation parameter;

determining compressed de-Mura data corresponding to the compression unit according to the fitted compensation parameter;

obtaining a gamma curve and a luminance value of a target pixel;

determining the standard driving voltage value of the target pixel when the subject display content is being displayed according to the gamma value and the luminance value of the target pixel;

obtaining a target compression unit corresponding to the target pixel;

determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit;

determining an effective driving voltage value of the target pixel when the subject content is being displayed according to a position information where the target pixel is in the target compression unit and the target compensation curve parameter; and driving the display panel according to the effective driving voltage of the target pixel of the display panel.

Optionally, the step of performing the fitting operation on the compensation parameter to obtain the fitted compensation parameter comprises:

determining a curve type according to a variance trend of the compensation parameter, wherein the curve type comprises a parabola; and performing the fitting operation on the compensation parameter according to the curve type to obtain the fitted compensation parameter.

Optionally, the step of performing the fitting operation on the compensation parameter according to the curve type to obtain the fitted compensation parameter comprises:

setting a compensation equation corresponding to the compensation curve according to the curve type; and determining the compensation curve parameter of the compensation curve according to the fitted compensation parameter.

Optionally, the position information of the target pixel in the target compressing unit comprises a first row and the step of determining the effective driving voltage value of the target pixel when the subject content is being displayed according to the position information where the target pixel is in the target compression unit and the target compensation curve parameter comprises:

obtaining a global row identification of the target pixel;

performing a complementation operation on the global row identification according to the compression parameter to obtain a unit row identification of the target pixel; and determining the effective driving voltage value of the target pixel when the subject display content is being displayed according to the unit row identification, the compression equation and the target compensation curve parameter.

Optionally, the position information of the target pixel in the target compressing unit comprises a first column and the step of determining the effective driving voltage value of the target pixel when the subject content is being displayed according to the position information where the target pixel is in the target compression unit and the target compensation curve parameter comprises:

obtaining a global column identification of the target pixel;

performing a complementation operation on the global column identification according to the compression parameter to obtain a unit column identification of the target pixel; and determining the effective driving voltage value of the target pixel when the subject display content is being displayed according to the unit column identification, the compression equation and the target compensation curve parameter.

Optionally, the position information of the target pixel in the target compressing unit comprises a position other than a first row or a first column and the step of determining the effective driving voltage value of the target pixel when the subject content is being displayed according to the position information where the target pixel is in the target compression unit and the target compensation curve parameter comprises:

obtaining a global column identification and a global row identification of the target pixel;

respectively performing a complementation operation on the global column identification and the global row identification according to the compression parameter to obtain a unit column identification and a unit row identification of the target pixel; and determining a first effective driving voltage value corresponding to the unit row identification and a second effective driving voltage value corresponding to the unit column identification; and calculating a comparison value between the first effective driving voltage value and the second effective driving voltage value and determining the comparison value as the effective driving voltage value of the target pixel when the subject display content is being displayed.

Optionally, the step of obtaining the compensation parameter corresponding to the subject driving voltage value of the pixel to be tested comprises:

obtaining the subject driving voltage value and an actual driving voltage value of the pixel to be tested; and determining the compensation parameter corresponding to the subject driving voltage value of the pixel to be tested according to a difference between the subject driving voltage value and the actual driving voltage value.

Advantageous Effect

According to an embodiment of the present disclosure, a display panel driving method, a display device and a driving device are provided. The method obtains a standard driving voltage value of a target pixel when a subject display content is being displayed and a target compression unit corresponding to the target pixel, determines a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit, determines an effective driving voltage value of the target pixel when the subject content is being displayed according to a position information where the target pixel is in the target compression unit and the target compensation curve parameter; and drives the display panel according to the effective driving voltage of the target pixel of the display panel. The compressed de-Mura data stored in the de-Mura look-up table includes each driving voltage value and the corresponding compensation curve parameter of the target compression unit. The stored compensation curve parameter is a curve parameter of an actual compensation parameter variance trend, which better fits the actual operation in contrast to the linear compensation. In addition, according to the standard driving voltage value of the target pixel, the target compensation curve parameter could be determined from the de-Mura data corresponding to the target compression unit and the decompression operation could be performed according the position information where the target pixel is in the target compression unit. This decompression method could correctly identify the corresponding decompression data and thus the decompressed data could be very close to the actual data. This raises the decompression accuracy of decompressing the de-Mura data.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Spatially relative terms, such as “center,” “upper,” “lower,” “left,” “right,” “vertical,” “horizontal,” “top,” “bottom,” “inner,” “outer,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. In addition, descriptions related to “first”, “second”, etc. in this disclosure are for descriptive purposes only, and cannot be understood as indicating or implying their relative importance or implicitly indicating the number of technical features indicated. Therefore, the features defined as “first” and “second” may explicitly or implicitly include at least one of the features. In the description of the present disclosure, the meaning of “a plurality” is at least two, for example, two, three, etc., unless it is specifically and specifically defined otherwise.

One objective of an embodiment of the present disclosure is to provide a display panel driving method, a display device and a driving device, for alleviate the issue of data distortion in the conventional compression/decompression operation.

Figure 1:
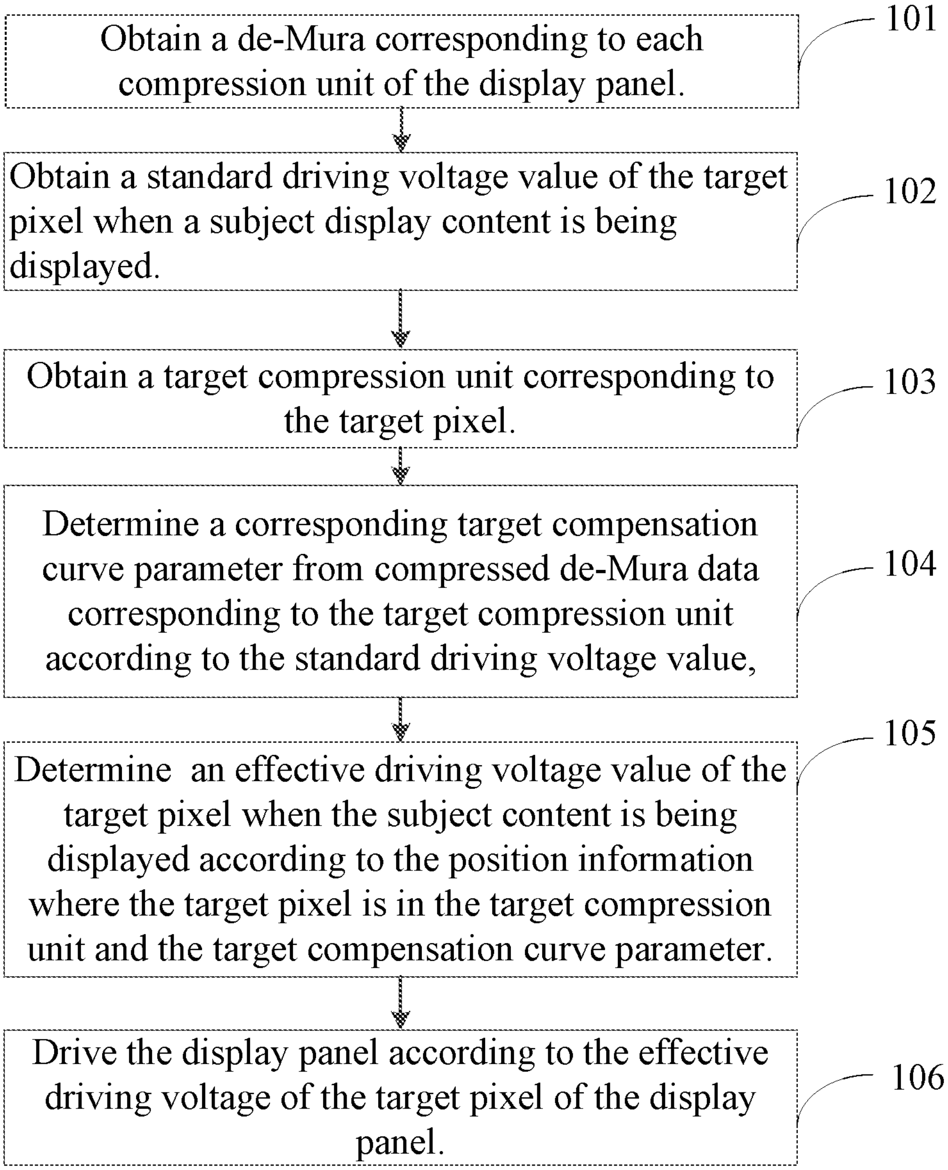
FIG. 1 is a flow chart of a display panel driving method according to an embodiment of the present disclosure.

Please refer to FIG. 1. FIG. 1 is a flow chart of a display panel driving method according to an embodiment of the present disclosure. As shown in FIG. 1, the display panel driving method comprises:

Step 101: obtaining a de-Mura corresponding to each compression unit of the display panel.

Figure 3:
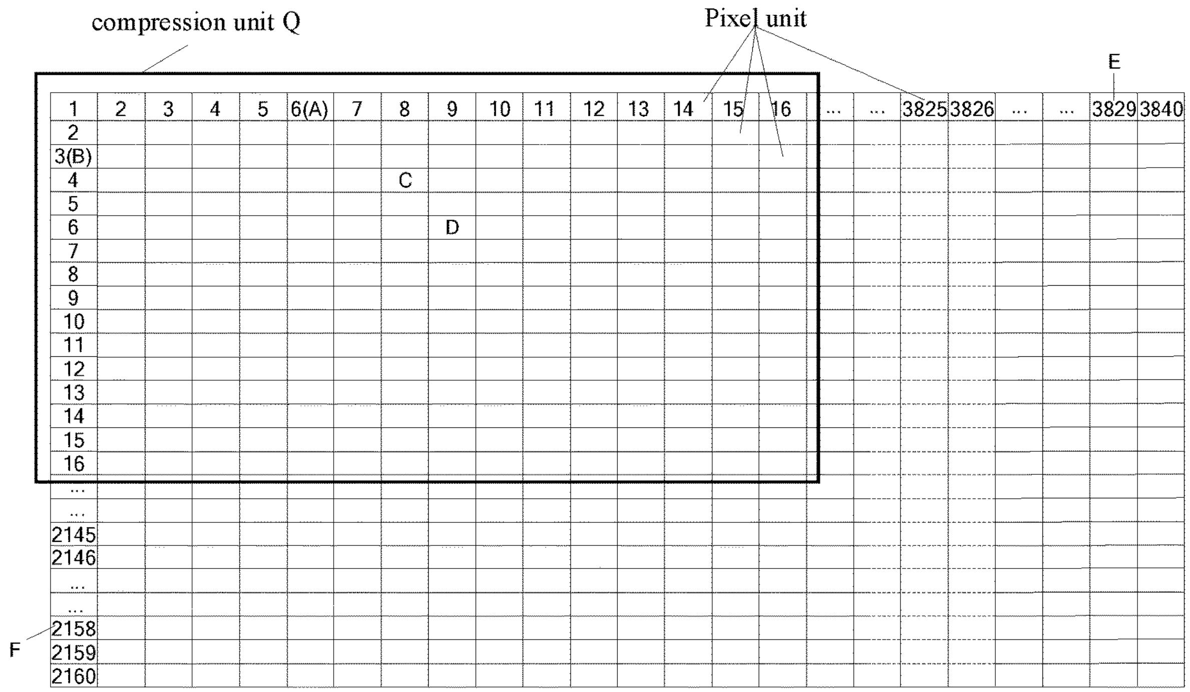
FIG. 3 is a diagram of a compression unit according to an embodiment of the present disclosure.
Figure 4:
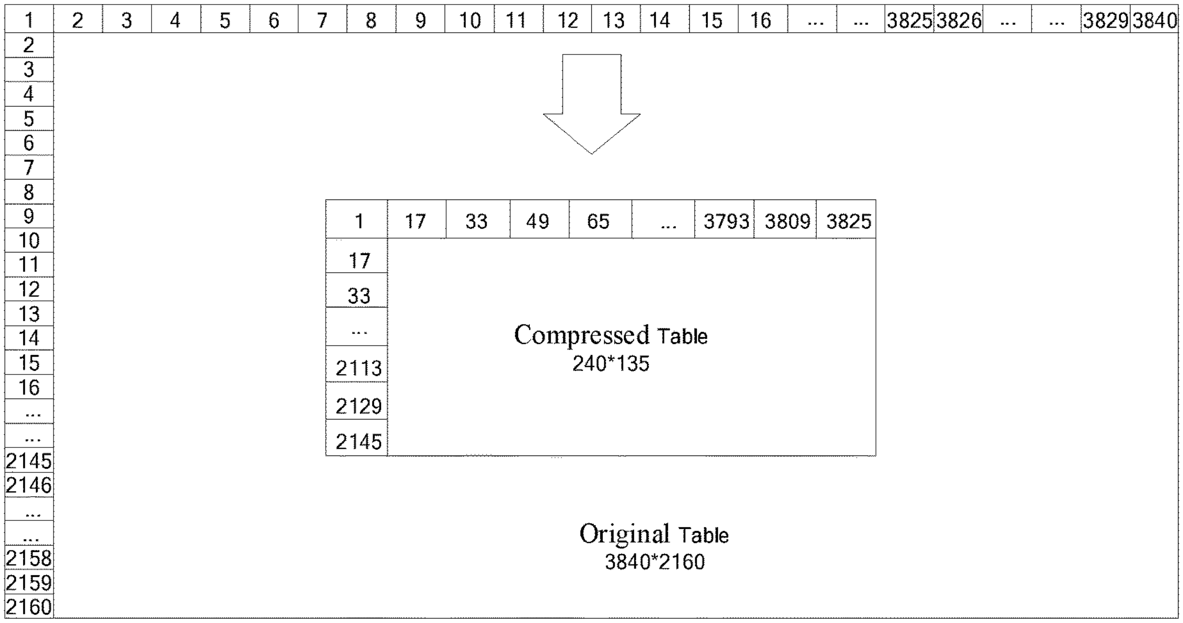
FIG. 4 is a diagram of compressing the original de-Mura table according to an embodiment of the present disclosure.

The display panel comprises a plurality of compression units arranged in an array. The compression unit comprises M*N pixels arranged in an array. The conventional de-Mura technique is performed based on each pixel. That is, each pixel has a corresponding de-Mura datum. Please refer to FIG. 3. FIG. 3 is a diagram of a compression unit according to an embodiment of the present disclosure. As shown in FIG. 3, a display panel having a high resolution of 3840*2160 is taken as an example. The display panel has 3840*2160 pixels. That is, the de-Mura table has 3840*2160 data before compression. If the table is compressed using 1:16 ratio, then the compression unit is composed of 16*16 (M=16 and N=16) pixels. Please refer to FIG. 4. FIG. 4 is a diagram of compressing the original de-Mura table according to an embodiment of the present disclosure. As shown in FIG. 4, the compressed de-Mura table is composed of 240*135 data.

In this embodiment, the pixel could be a pixel of an RGB structure. That is, in the pixels of the same row, the red sub-pixels, the green sub-pixels and the blue sub-pixels are sequentially arranged in a certain order. In this way, the sampling unit needs to respectively provide corresponding de-Mura values to the sub-pixels of the three colors. In another embodiment, the pixel could be a RGBW pixel, which may comprise a red sub-pixels, a green sub-pixels, a blue sub-pixel and a white sub-pixel arranged in a sub-pixel array or may be implemented by sub-pixel modulation. In another embodiment, the same de-Mura value could be assigned to the sub-pixels of three different colors or only two different colors.

Step 101 comprises: obtaining a compression parameter and a decompression method; determining a pixel to be tested in the compression unit according to the compression parameter; obtaining a compensation parameter corresponding to the subject driving voltage value of the pixel to be tested; performing a fitting operation on the compensation parameter to obtain a fitted compensation parameter; and determining compressed de-Mura data corresponding to the compression unit according to the fitted compensation parameter.

Specifically, if the compression operation is performed using the 1:16 ratio, the compression unit is a pixel array of 16*16 (M=16 and N=16) pixels. After the compression operation, as shown in FIG. 4, the display panel is composed of 240*135 compression units. Here, the compression parameters M and N are equal to 16. If the compression operation is performed using the 1:8 ratio, then the compression parameters M and N are equal to 8. Here, M represents the horizontal compression parameter and N represents the vertical compression parameter.

The driving voltage value comprises a grayscale voltage value.

According to the position information of the target pixel in the target compression unit, the decompression operation could be divided into the following three ways: 1. The target pixel is in the first row; 2. The target pixel is in the first column; and 3. The target pixel is in another position other than the first row or the first column.

The pixel to be tested represents a pixel located in the first row or the first column of the target compression unit. Please note, the subject driving voltage of the pixel to be tested is a driving voltage value that could drive the pixel to have an ideal luminance value. Specifically, the ideal driving voltage value corresponding to the pixel could be determined according to the ideal luminance value and the gamma curve. The ideal driving voltage value is the target driving voltage value. Here, the gamma value Gamma of the gamma curve could be 2.2 or 2.3 (Gamma=2.2 or 2.3). Or, the gamma value could be set according to the user demands and thus is not a limitation.

The compensation parameter could be the actual driving voltage value that could drive the pixels to reach the same luminance when the de-Mura operation is being performed. Or, the compensation parameter could be the difference between the actual driving voltage value and the ideal driving voltage value of the target pixel in order to drive the pixels to reach the same luminance when the de-Mura operation is being performed.

The step of performing the fitting operation on the compensation parameter to obtain the fitted compensation parameter comprises: determining a curve type according to a variance trend of the compensation parameter, wherein the curve type comprises a parabola; and performing the fitting operation on the compensation parameter according to the curve type to obtain the fitted compensation parameter. Here, the curve type could be a linear, a parabola, or sine/cosine curve. Taking FIG. 5 as an example, the compensation parameter represents the data corresponding to the "original columns" in the table. The fitted compensation parameter represents the data corresponding to the "fitted columns" in the table.

The step of performing the fitting operation on the compensation parameter according to the curve type to obtain the fitted compensation parameter comprises: setting a compensation equation corresponding to the compensation curve according to the curve type; and determining the compensation curve parameter of the compensation curve according to the fitted compensation parameter.

Figure 5:
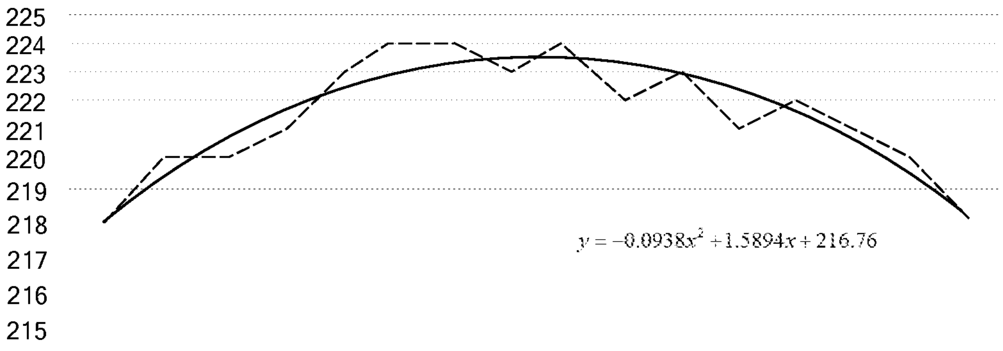
FIG. 5 is a diagram of a compensation equation according to an embodiment of the present disclosure.

FIG. 5 depicts the relationship between the compensation parameter and the effective driving values of the pixels in the first row of the compression unit Q. The dotted line represents the relationship between the unit row identifications of the pixels in the first row of the target compression unit (x could be 1, 2, 3, . . . , 16) and the compensation parameters of the pixels. Here, the compensation parameter could be the effective driving voltage value for driving the pixel to reach a compensated luminance after the de-Mura operation. According to the dotted line, it can be understood that the variance trend of the compensation parameter by the unit row identification of the pixel is a quadratic function curve. In other words, the variance trend could be represented by a quadratic function $y=ax^2+bx+c$. According to the fitted compensation parameter, the data corresponding to the "fitted columns" in the table shown in FIG. 5, the compensation equation could be determined as $y=-0.0938x^2+1.5894x+216.76$ Here, y represents the fitted compensation parameter of each pixel and the effective driving voltage value of each pixel. x represents the unit row identification in the target compression unit Q where the first row of pixels are located. x is an integer not smaller than 1 but not greater than the compression parameter (M=16). Here, x is an integer from 1 to 16. According to the compensation equation $y=-0.0938x^2+1.5894x+216.76$, the compensation curve parameters could be determined to be −0.0938, 1.5894 and 216.76.

In an embodiment, the data stored in each compression unit is: 220 (the gray voltage value)-(−0.0938, 1.5894, 216.76) (horizontal compensation curve parameters)-(−0.0916, 1.6459, 217.53) (vertical compensation curve parameters), 50 (gray voltage value)-(−0.0324, 1.2345, 47.5328) (horizontal compensation curve parameters)-(−0.0298, 1.3261, 48.7534) (vertical compensation curve parameters).

Step 102: obtaining a standard driving voltage value of the target pixel when a subject display content is being displayed.

In an embodiment, the subject display content could be an ideal gray value (an ideal luminance value) of the pixel. For example, if the display panel could display 256 gray values, then the subject display content could be any one of the gray values 0-255.

In an embodiment, the standard driving voltage value could be obtained from the gamma curve and the luminance value. The equation of the gamma curve is: $L_x=(x/z)^{\gamma}\times L_z$. Here, x is the driving voltage value of the pixel. $L_x$ is the luminance value when the driving voltage of the pixel is x. z is the maximum driving voltage value. $L_z$ is the luminance value when the driving voltage of the pixel is the maximum driving voltage z. γ is the target gamma value of the display panel. Optionally, the target gamma value could be set as 2.2 or 2.3 or could be set according to the user demands. As previously mentioned, the target gamma value is not limited.

Step 103: obtaining a target compression unit corresponding to the target pixel.

In an embodiment, as shown in FIG. 3, if the target pixel is C, then the corresponding target compression unit is the compression unit Q. If the target pixel is D, then the corresponding target compression unit is the compression unit Q.

Step 104: determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit.

Taking a display panel that can display 256 gray values as an example. The subject display content could be any one of the gray values 0-255. Each compression unit could store 256 subject driving voltage values and corresponding compensation curve parameters. The subject driving voltage value in the compressed de-Mura data could be determined according to the standard driving voltage values of the subject display content such that the corresponding compensation curve parameter could be determined. As shown in FIG. 5, the standard driving voltage value 220 could be obtained according to the luminance value and the gamma curve of the pixels of the first row of the compression unit Q. According to the standard driving voltage value 220, the compensation curve parameter when the subject driving voltage value is 220 of the de-Mura data could be determined. The compensation curve parameters are −0.0938, 1.5894, and 216.76.

Step 105: determining an effective driving voltage value of the target pixel when the subject content is being displayed according to the position information where the target pixel is in the target compression unit and the target compensation curve parameter.

Taking the target pixel A and the horizontal compression parameter M=16 as an example. The position information of the pixel A in the target compression unit is the first row. In this case, the step 105 comprises: obtaining a global row identification of the target pixel (in this case, the global row identification is 6); performing a complementation operation on the global row identification according to the compression parameter (M=16) to obtain a unit row identification of the target pixel (the unit row identification is 6); and determining the effective driving voltage value of the target pixel when the subject display content is being displayed according to the unit row identification, the compression equation and the target compensation curve parameter. As shown in FIG. 5, the target compensation curve parameters corresponding to the pixels of the first row are respectively −0.0938, 1.5894, and 216.76 and the corresponding compensation equation is $y=-0.0938x^2+1.5894x+216.76$. Here, the unit row identification x is 6. Accordingly, the effective driving voltage value y of the target pixel when the subject display content is being displayed is 223. That is, the effective driving voltage value of the pixel is 223.

If the target pixel is E and the horizontal compression parameter M=16, then the position information of the pixel E in the target compression unit is the first row. In this case, the global row identification of the target pixel is 3829. According to the compression parameter M=16, the complementation operation is performed on the global row identification 3829 such that the unit row identification of the target pixel 15 is obtained. Then, the corresponding target compensation curve parameters in the de-Mura data of the target compression unit corresponding to the pixel could be determined according to the standard driving voltage value of the target pixel. Finally, the unit row identification (x=15) could be substituted into the compensation equation such that the effect driving voltage value of the pixel could be determined.

If the target pixel is B and the vertical compression parameter N=16, then the position information of the pixel B in the target compression unit is the first column. In this case, the step 105 comprises: obtaining a global column identification of the target pixel (in this case, the global column identification is 3); performing a complementation operation on the global column identification according to the compression parameter (N=16) to obtain a unit column identification of the target pixel (the unit column identification is 3); and determining the effective driving voltage value of the target pixel when the subject display content is being displayed according to the unit column identification, the compression equation and the target compensation curve parameter.

Similarly, if the target pixel is F and the vertical compression parameter N=16, then the position information of the pixel F in the target compression unit is the first column. In this case, the global column identification of the target pixel is 2158. According to the compression parameter N=16, the complementation operation is performed on the global row identification 2158 such that the unit column identification of the target pixel 14 is obtained. Then, the corresponding target compensation curve parameters in the de-Mura data of the target compression unit corresponding to the pixel could be determined according to the standard driving voltage value of the target pixel. Finally, the unit column identification (y=14) could be substituted into the compensation equation such that the effect driving voltage value of the pixel could be determined.

If the target pixel is C, the horizontal compression parameter M=16 and the vertical compression parameter N=16, then the position information of the pixel C in the target compression unit is the other position other than the first column and the first row. In this case, the step 105 comprises: obtaining the global row identification of the target pixel (here, the global row identification is 4) and the global column identification (here, the global column identification is 8); performing a complementation operation on the global row identification according to the horizontal compression parameter (here, M=16) to obtain a unit row identification (here, the unit row identification is 8); performing a complementation operation on the global column identification according to the vertical compression parameter (here, N=16) to obtain a unit column identification (here, the unit column identification is 4); and determining a first effective driving voltage value corresponding to the unit row identification 4 and a second effective driving voltage value corresponding to the unit column identification 8 (here, the first effective driving voltage could be calculated through the compensation curve parameters of the first row of the target compression unit and the unit row identification 4 and the second effective driving voltage could be calculated through the compensation curve parameters of the first column of the target compression unit and the unit column identification 8); and calculating a comparison value between the first effective driving voltage value and the second effective driving voltage value and determining the comparison value as the effective driving voltage value of the target pixel when the subject display content is being displayed. (as shown in FIG. 5, the second effective driving voltage is 223, then the comparison value between the first effective driving voltage value and the second effective driving voltage value could be determined.)

Here, the comparison value could be an average value or a square difference between the first effective driving voltage value and the second effective driving voltage value.

In this embodiment, if the horizontal compression parameter divided by the global row identification could result in an integer, then the complementation operation is performed on the global column identification to obtain the unit column identification. In this case, the obtained unit column identification is equal to the horizontal compression parameter. Similarly, if the vertical compression parameter divided by the global column identification could result in an integer, then the complementation operation is performed on the global row identification to obtain the unit row identification. In this case, the obtained unit row identification is equal to the vertical compression parameter.

The complementation operation is performed on the global row identification or the global column identification according to the compression parameters. The remainder is not smaller than 1 but not greater than the integer of the compression parameter.

Step 106: driving the display panel according to the effective driving voltage of the target pixel of the display panel.

After the effective driving voltage values of all target pixels of the display panel, the effective driving voltage values could be used to drive the target pixels such that the display panel could work.

In an embodiment, the target pixel could be a pixel where corresponding data, such as the effective driving voltage value, had been stored in the driving voltage input board corresponding to the display panel. Here, the driving voltage input board could be a timing controller (TCON) board connected to the display panel. The driving voltage input board could store a driving voltage table, which could store the effective driving voltages corresponding to the target pixels. In this way, when the display panel works, the corresponding effective driving voltage could be looked up in the driving voltage table according to the target pixel such that the target pixel could be driven by the effective driving voltage and the entire display panel could work.

In an embodiment, the compressed de-Mura data are stored in the de-Mura look-up table. The compressed de-Mura data comprises the subject driving voltage value and the corresponding compensation curve parameter of each pixel. In the conventional compression/decompression technique, the de-Mura table stores the gray values of each gray scale. In contrast to the conventional compression/decompression technique, this disclosure performs the compression/decompression according to the functional fitting. This mechanism is more reasonable and the data recovery could better fit the current Mura situation and thus raises the accuracy of the de-Mura compression/decompression operation.

Figure 2A:
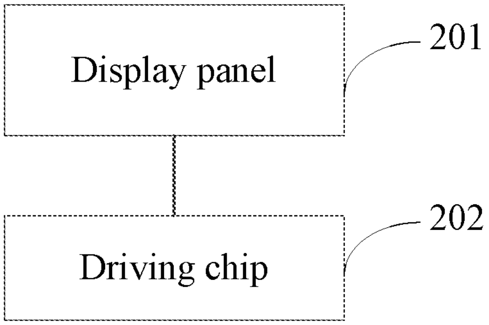
FIG. 2*a* is a block diagram of a display device according to an embodiment of the present disclosure.

Please refer to FIG. 2*a*. FIG. 2*a* is a block diagram of a display device according to an embodiment of the present disclosure. As shown in FIG. 2*a*, the display device comprises a display panel 201 and a driving chip 202. The display panel 201 comprises a plurality of compression units arranged in an array.

The driving chip 202 is configured to obtain a standard driving voltage value of a target pixel when a subject display content is being displayed; obtain a target compression unit corresponding to the target pixel; determine a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit; determine an effective driving voltage value of the target pixel when the subject content is being displayed according to a position information where the target pixel is in the target compression unit and the target compensation curve parameter; and drive the display panel according to the effective driving voltage of the target pixel of the display panel.

In an embodiment, the display panel 201 comprises an LCD panel or an OLED display panel.

Figure 2B:
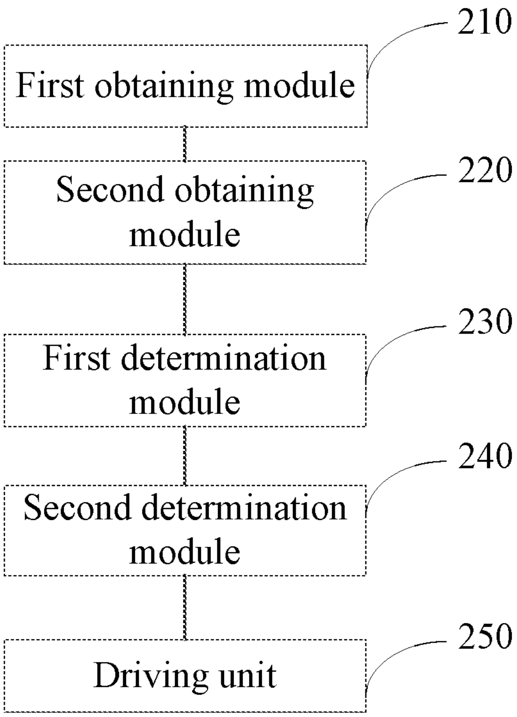
FIG. 2*b* is a block diagram of a driving device according to an embodiment of the present disclosure.

Please refer to FIG. 2*b*. FIG. 2*b* is a block diagram of a driving device according to an embodiment of the present disclosure. As shown in FIG. 2*b*, the driving device comprises a first obtaining module 210, a second obtaining module 220, a first determination module 230, a second determination module 240 and a driving module 250.

The first obtaining module 210 is configured to obtain a standard driving voltage value of a target pixel when a subject display content is being displayed. The second obtaining module 220 is configured to obtain a target compression unit corresponding to the target pixel. The first determination module 230 is configured to determine a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit. The second determination module 240 is configured to determine an effective driving voltage value of the target pixel when the subject content is being displayed according to a position information where the target pixel is in the target compression unit and the target compensation curve parameter. The driving module 250 is configured to drive the display panel according to the effective driving voltage of the target pixel of the display panel.

Optionally, the driving device could further comprise a third obtaining module. The third obtaining module is configured to obtain the compressed de-Mura data corresponding to each compression unit of the display panel. Specifically, the third obtaining module could obtain the compression parameter and the decompression method; determine a pixel to be tested in the compression unit according to the compression parameter; obtain a compensation parameter corresponding to the subject driving voltage value of the pixel to be tested; perform a fitting operation on the compensation parameter to obtain a fitted compensation parameter; and determine compressed de-Mura data corresponding to the compression unit according to the fitted compensation parameter.

Optionally, the driving device could further comprise a fitting module. The fitting module is configured to determine a curve type according to a variance trend of the compensation parameter; and perform the fitting operation on the compensation parameter according to the curve type to obtain the fitted compensation parameter. Here, the curve type comprises a parabola.

Optionally, the driving device could further comprise a third determining module. The third determining module is configured to set a compensation equation corresponding to the compensation curve according to the curve type; and determine the compensation curve parameter of the compensation curve according to the fitted compensation parameter.

In each of the above-mentioned embodiments, it may focus on different parts. However, for those are not illustrated in detail in a certain embodiment, a POSITA could refer to related descriptions in another embodiment.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A method for driving a display panel, the display panel comprising a plurality of compression units arranged in an array, the method comprising:

- obtaining a standard driving voltage value of a target pixel when a subject display content is being displayed;
- obtaining a target compression unit corresponding to the target pixel;
- determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit;
- determining an effective driving voltage value of the target pixel when the subject content is being displayed according to a position information where the target pixel is in the target compression unit and the target compensation curve parameter; and
- driving the display panel according to the effective driving voltage of the target pixel of the display panel.

2. The method of claim 1, further comprising following steps before the step of obtaining the standard driving voltage value of the target pixel when the subject display content is being displayed:

- obtaining a compression parameter and a decompression method;
- determining a pixel to be tested in the compression unit according to the compression parameter;

obtaining a compensation parameter corresponding to the subject driving voltage value of the pixel to be tested;

performing a fitting operation on the compensation parameter to obtain a fitted compensation parameter; and determining compressed de-Mura data corresponding to the compression unit according to the fitted compensation parameter.

3. The method of claim 2, wherein the step of performing the fitting operation on the compensation parameter to obtain the fitted compensation parameter comprises:

determining a curve type according to a variance trend of the compensation parameter, wherein the curve type comprises a parabola; and performing the fitting operation on the compensation parameter according to the curve type to obtain the fitted compensation parameter.

4. The method of claim 3, wherein the step of performing the fitting operation on the compensation parameter according to the curve type to obtain the fitted compensation parameter comprises:

setting a compensation equation corresponding to the compensation curve according to the curve type; and determining the compensation curve parameter of the compensation curve according to the fitted compensation parameter.

5. The method of claim 2, wherein the step of obtaining the compensation parameter corresponding to the subject driving voltage value of the pixel to be tested comprises:

obtaining the subject driving voltage value and an actual driving voltage value of the pixel to be tested; and determining the compensation parameter corresponding to the subject driving voltage value of the pixel to be tested according to a difference between the subject driving voltage value and the actual driving voltage value.

6. The method of claim 1, wherein the position information of the target pixel in the target compressing unit comprises a first row and the step of determining the effective driving voltage value of the target pixel when the subject content is being displayed according to the position information where the target pixel is in the target compression unit and the target compensation curve parameter comprises:

obtaining a global row identification of the target pixel;

performing a complementation operation on the global row identification according to the compression parameter to obtain a unit row identification of the target pixel; and determining the effective driving voltage value of the target pixel when the subject display content is being displayed according to the unit row identification, the compression equation and the target compensation curve parameter.

7. The method of claim 1, wherein the position information of the target pixel in the target compressing unit comprises a first column and the step of determining the effective driving voltage value of the target pixel when the subject content is being displayed according to the position information where the target pixel is in the target compression unit and the target compensation curve parameter comprises:

obtaining a global column identification of the target pixel;

performing a complementation operation on the global column identification according to the compression parameter to obtain a unit column identification of the target pixel; and determining the effective driving voltage value of the target pixel when the subject display content is being displayed according to the unit column identification, the compression equation and the target compensation curve parameter.

8. The method of claim 1, wherein the position information of the target pixel in the target compressing unit comprises a position other than a first row or a first column and the step of determining the effective driving voltage value of the target pixel when the subject content is being displayed according to the position information where the target pixel is in the target compression unit and the target compensation curve parameter comprises:

obtaining a global column identification and a global row identification of the target pixel;

respectively performing a complementation operation on the global column identification and the global row identification according to the compression parameter to obtain a unit column identification and a unit row identification of the target pixel; and determining a first effective driving voltage value corresponding to the unit row identification and a second effective driving voltage value corresponding to the unit column identification; and calculating a comparison value between the first effective driving voltage value and the second effective driving voltage value and determining the comparison value as the effective driving voltage value of the target pixel when the subject display content is being displayed.

9. The method of claim 1, wherein the driving voltage value comprises a grayscale voltage value.

10. The method of claim 1, wherein the step of obtaining the standard driving voltage value of the target pixel when the subject display content is being displayed comprises:

obtaining a gamma curve and a luminance value of the target pixel; and determining the standard driving voltage value of the target pixel when the subject display content is being displayed according to the gamma value and the luminance value of the target pixel.

11. A display device comprising:

a display panel comprising a plurality of compression units arranged in an array; and a driving chip, configured to perform operations comprising:

obtaining a standard driving voltage value of a target pixel when a subject display content is being displayed;

obtaining a target compression unit corresponding to the target pixel;

determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit;

determining an effective driving voltage value of the target pixel when the subject content is being displayed according to a position information where the target pixel is in the target compression unit and the target compensation curve parameter; and driving the display panel according to the effective driving voltage of the target pixel of the display panel.

12. A method for driving a display panel, the display panel comprising a plurality of compression units arranged in an array, the method comprising:

obtaining a compression parameter and a decompression method;

determining a pixel to be tested in the compression unit according to the compression parameter;

obtaining a compensation parameter corresponding to the subject driving voltage value of the pixel to be tested;

performing a fitting operation on the compensation parameter to obtain a fitted compensation parameter;

determining compressed de-Mura data corresponding to the compression unit according to the fitted compensation parameter;

obtaining a gamma curve and a luminance value of a target pixel;

determining the standard driving voltage value of the target pixel when the subject display content is being displayed according to the gamma value and the luminance value of the target pixel;

obtaining a target compression unit corresponding to the target pixel;

determining a corresponding target compensation curve parameter from compressed de-Mura data corresponding to the target compression unit according to the standard driving voltage value, wherein the compressed de-Mura data comprise each subject driving voltage value and a corresponding compensation curve parameter of the target compression unit;

determining an effective driving voltage value of the target pixel when the subject content is being displayed according to a position information where the target pixel is in the target compression unit and the target compensation curve parameter; and driving the display panel according to the effective driving voltage of the target pixel of the display panel.

13. The method of claim 12, wherein the step of performing the fitting operation on the compensation parameter to obtain the fitted compensation parameter comprises:

determining a curve type according to a variance trend of the compensation parameter, wherein the curve type comprises a parabola; and performing the fitting operation on the compensation parameter according to the curve type to obtain the fitted compensation parameter.

14. The method of claim 13, wherein the step of performing the fitting operation on the compensation parameter according to the curve type to obtain the fitted compensation parameter comprises:

setting a compensation equation corresponding to the compensation curve according to the curve type; and determining the compensation curve parameter of the compensation curve according to the fitted compensation parameter.

15. The method of claim 12, wherein the position information of the target pixel in the target compressing unit comprises a first row and the step of determining the effective driving voltage value of the target pixel when the subject content is being displayed according to the position information where the target pixel is in the target compression unit and the target compensation curve parameter comprises:

obtaining a global row identification of the target pixel;

performing a complementation operation on the global row identification according to the compression parameter to obtain a unit row identification of the target pixel; and determining the effective driving voltage value of the target pixel when the subject display content is being displayed according to the unit row identification, the compression equation and the target compensation curve parameter.

16. The method of claim 12, wherein the position information of the target pixel in the target compressing unit comprises a first column and the step of determining the effective driving voltage value of the target pixel when the subject content is being displayed according to the position information where the target pixel is in the target compression unit and the target compensation curve parameter comprises:

obtaining a global column identification of the target pixel;

performing a complementation operation on the global column identification according to the compression parameter to obtain a unit column identification of the target pixel; and determining the effective driving voltage value of the target pixel when the subject display content is being displayed according to the unit column identification, the compression equation and the target compensation curve parameter.

17. The method of claim 12, wherein the position information of the target pixel in the target compressing unit comprises a position other than a first row or a first column and the step of determining the effective driving voltage value of the target pixel when the subject content is being displayed according to the position information where the target pixel is in the target compression unit and the target compensation curve parameter comprises:

obtaining a global column identification and a global row identification of the target pixel;

respectively performing a complementation operation on the global column identification and the global row identification according to the compression parameter to obtain a unit column identification and a unit row identification of the target pixel; and determining a first effective driving voltage value corresponding to the unit row identification and a second effective driving voltage value corresponding to the unit column identification; and calculating a comparison value between the first effective driving voltage value and the second effective driving voltage value and determining the comparison value as the effective driving voltage value of the target pixel when the subject display content is being displayed.

18. The method of claim 12, wherein the step of obtaining the compensation parameter corresponding to the subject driving voltage value of the pixel to be tested comprises:

obtaining the subject driving voltage value and an actual driving voltage value of the pixel to be tested; and determining the compensation parameter corresponding to the subject driving voltage value of the pixel to be tested according to a difference between the subject driving voltage value and the actual driving voltage value.

* * * * *